United States Patent [19]

Moss et al.

[11] Patent Number: 4,984,856

[45] Date of Patent: Jan. 15, 1991

[54] HOLOGRAPHIC EXPOSURE SYSTEM TO REDUCE SPURIOUS HOLOGRAM NOISE

[75] Inventors: Gaylord E. Moss, Marina del Rey; John E. Wreede, Monrovia, both of Calif.

[73] Assignee: Hughes Aircraft Company, Los Angeles, Calif.

[21] Appl. No.: 401,327

[22] Filed: Aug. 31, 1989

[51] Int. Cl.$^5$ ............................................. G03H 1/20
[52] U.S. Cl. .................................... 350/3.67; 350/3.69; 350/3.8
[58] Field of Search ..................... 350/3.6, 3.69, 3.72, 350/3.81, 3.83, 3.67, 3.8

[56] References Cited

U.S. PATENT DOCUMENTS

| | | | |
|---|---|---|---|
| 4,312,559 | 1/1982 | Kojima et al. | 350/3.72 |
| 4,416,540 | 11/1983 | Nicholson | 350/3.69 |
| 4,458,977 | 7/1984 | Arns et al. | 350/3.6 |
| 4,458,978 | 7/1984 | Arns et al. | 350/3.83 |
| 4,478,490 | 10/1984 | Wreede et al. | 350/3.81 |
| 4,530,564 | 7/1985 | Close | 350/3.69 |
| 4,715,670 | 12/1987 | Jurukhano | 350/3.69 |
| 4,895,419 | 1/1990 | Doyle et al. | 350/3.69 |

*Primary Examiner*—Bruce Y. Arnold
*Assistant Examiner*—Martin Lerner
*Attorney, Agent, or Firm*—Leonard A. Alkov; Wanda K. Denson-Low

[57] ABSTRACT

A method and apparatus of exposing a hologram to reduce spurious noise holograms. The exposure light source is moved relative to a recording module within predetermined distances that will ensure a blurring of the fringes of a noise hologram that is formed at a distance from a primary hologram while substantially not affecting the primary hologram. The controlled relative movement of the exposure source and the recording module within predetermined limits provide a considerable improvement in reducing the efficiency of spurious noise holograms.

23 Claims, 3 Drawing Sheets

HOLOGRAPHIC EXPOSURE SYSTEM TO REDUCE SPURIOUS HOLOGRAM NOISE

BACKGROUND OF THE INVENTION

1. Field of the Invention

This invention relates to a system and method for forming holograms and, more particularly, to a system and method for forming holograms on a production basis in an efficient and economic manner while substantially reducing undesirable spurious hologram noise recordings.

2. Description of Related Art

High quality holographic optical elements are used in diffraction optics display systems, such as Heads Up Displays (HUD), for advanced aircraft, helmet mounted displays, laser eye protective devices, narrow band reflective filters, and holographic high gain screens for simulators. These are only a few of the many uses of high quality reflective holograms. There have existed problems in the prior art in providing economical mass production of reflective holographic optical elements where production units are "copies" of either a master reference object or a master hologram, which provides an aspheric reflective wavefront for a HUD.

A constant problem in diffraction optic display systems utilizing a hologram has been a degradation of the holographic images as a result of the effects of spurious reflection and transmission hologram recordings that are frequently generated during the holographic replication process. Some of the most objectionable of those spurious noise holograms have been found to be generated by reflections from surfaces which are interfaces of materials of different indexes of refraction, such as air/glass interfaces of the transparent surfaces of the recording cover plate, the substrate, the recording medium, and optical elements. These reflections can combine with the primary holographic beams at the recording film to form both spurious reflection hologram recordings and spurious transmission hologram recordings. As a result, a subsequent display system will create ghost images from the spurious reflection hologram recordings and rainbow-like flare patterns from the spurious transmission hologram recordings.

The prior art has attempted to address these problems in numerous different ways. One approach has been to minimize the differences in index refraction by attempting to match the indexes of refraction with an index matching fluid, such as a mineral oil. Attempts have been made to immerse a recording module in an index of refraction matching oil bath. Another approach has been to form a hologram with energy beams impinging the recording film supporting elements at Brewster's angle.

U.S. Pat. Nos. 4,458,977, 4,458,978, and 4,456,328 disclose prior art approaches to eliminating the noise caused by a glass/air interface of an outer surface cover plate by moving the cover plate to change the phase of the reflected rays relative to the primary beams during the recording period so that spurious holograms are not formed. The rate of motion or phase change in accordance with these solutions is a function of the exposure time, which itself is a function of the sensitivity of the recording medium. The total amount of the motion is designed to require a phase change of one or more half wavelengths in the reflected noise beams to nullify any constructive or destructive interference patterns. These approaches have been proposed to solve the complex problems involved in the manufacturing of reflective holographic optical elements for use in heads up displays.

Generally, in providing these solutions in the prior art, there is a layer of index matching fluid, such as an appropriate mineral oil, which will vary in thickness during the cover movement. A relatively thick image degrading layer of index matching fluid has the capacity to degrade the surface of the reference object, such as an aspheric mirror, creating moving striations. These moving striations cause fringe degradation and frequently require the oil to be cleaned. Initially, a double beam system has been utilized, which required days of stabilization before an appropriate exposure. Subsequently, a master aspheric mirror single beam system was utilized; however, it still required many hours of stabilization and the use of relatively skilled labor.

Additionally, in the prior art approaches, only the outer surface, that is, the glass/air interface elements, could be provided with an anti-reflective coating. If an inner surface was required to be coated for optimum use in air, the anti-reflective coating would have to be added at a later time after the exposure, such as by adding an anti-reflective coated glass, which would add further weight, or by depositing a standard anti-reflective coating, which would frequently thermally destroy the hologram, or by depositing a cold anti-reflective coating, which would be less efficient and more fragile. Finally, this example of prior art required a piezoelectrically controlled exposure cover that had to be appropriately mounted and calibrated prior to exposure, and also taken into account in the design of the optical system.

U.S. Pat. No. 4,478,490 discloses an alternative method of reducing coherent noise content through the modulation of the position of an apodizer in the optical path during an exposure. The apodizer permits the amplitude of the wave front to be modified to alter a point source response, that is, to change in a predetermined way the point spread function whereby the fringe patterns created by the apodizer are unstable and hence reduce the noise content of the transmitted radiation.

Another prior art attempt to remove noise employs the use of a laser source without an etalon to reduce noise holograms from a surface further away than approximately two inches (a typical coherence length for a large argon laser). While this approach can reduce noise, it has the disadvantage of being a step process with either the etalon being in and the coherence length being many meters, or the etalon being not in, and the coherence length being on the order of inches. This relatively new approach can be acceptable where a distance of approximately one-quarter-inch is required, such as in a HUD-type hologram with an aspheric mirror surface.

The prior art has frequently recognized the desirability of reproducing copies from a master hologram. A theory of such copying of holograms is set forth in Brumm, "Copying Holograms," Applied Optics, Volume 5, No. 12, page 1946, December 1966. Reference is also made to U.S. Pat. No. 3,758,186, U.S. Pat. No. 3,639,031, U.S. Pat. No. 3,647,289, U.S. Pat. No. 4,312,559, and U.S. Pat. No. 4,530,564 to disclose other methods of copying holograms.

The prior art is still seeking an optimum method and apparatus for the reproduction of multiple hologram optical elements in an economical and efficient manner, including improving the format of providing a recording module for HUD manufacturing and reducing the creation of noise in the HUD hologram.

SUMMARY OF THE INVENTION

A method and apparatus for the production of holograms from a reference member, such as a master object or a master reference hologram, is provided. A beam of coherent energy, such as a laser, compatible with recording a hologram, is appropriately directed at the master reference member. The master reference member, in a preferred embodiment, has reflective properties to the beam of energy. A substrate having an inner and outer surface has deposited on its inner surface a recording medium that is specifically placed at a critical distance adjacent the master reference member. An anti-reflective coating can be predeposited on the outer surface of the substrate member to anticipate its ultimate use with a developed holographic image. The outer air interface should be preferably a distance of at least ten times the distance between the reference member and the recording medium.

A recording module including the master reference member and the substrate member with the holographic recording material mounted, together with an appropriate index of refraction matching fluid, such as an oil retained between the recording medium and the master reference member, can be appropriately sealed. This recording module can then be positioned at a specific distance from the source of the beam of coherent energy for exposure.

A feature of the present invention is the utilization of a point source during the exposure of the holographic optical element with a relative transverse movement between the point source and the recording medium. The movement of the point source is such that the change in relative phase between the incoming beam and the reflected beam is small, since the relative pathlength changes are also small, e.g., the movement can be in the range of 100 to $\approx$ 5,000 micrometers (0.2 m rad to 10 m rad). However, in contrast, any noise creating a spurious hologram will experience a change over a much greater distance, and there will be a relatively greater shift in the fringes for such a noise hologram. If these phase shifts reach a half wavelength, the noise hologram will be essentially wiped out. However, the amount of shift in the primary hologram will only be approximately 1/20th of the design wavelength, which should not measurably reduce the efficiency compared to the advantages of eliminating noise.

BRIEF DESCRIPTION OF THE DRAWINGS

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which like reference numbers refer to like parts, and in which:

DESCRIPTION OF THE PREFERRED EMBODIMENTS

Figure 1:
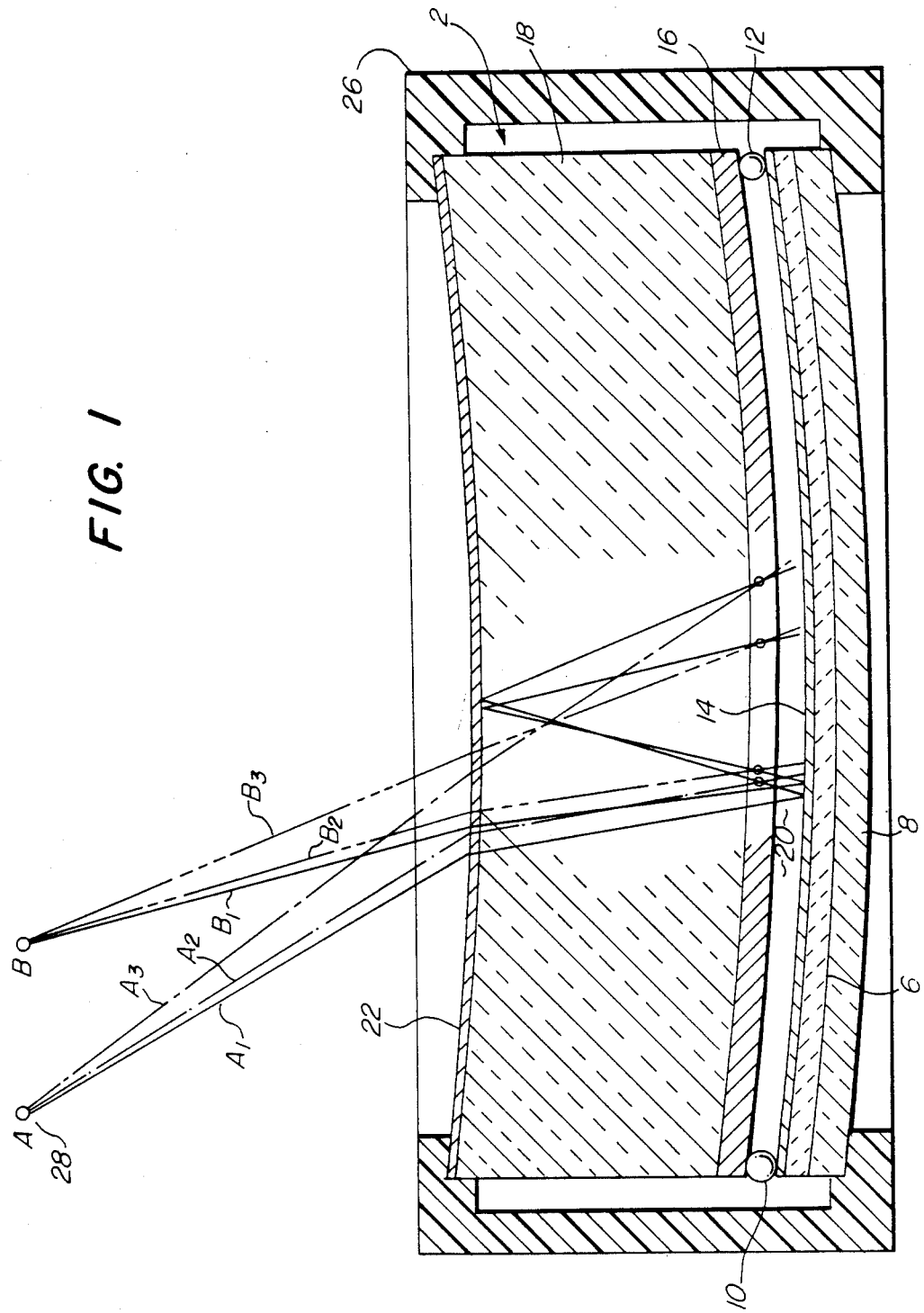
FIG. 1 is a schematic cross-sectional view of an assembled recording module being exposed.

The following description is provided to enable any person skilled in the holographic field to make and use the invention, and sets forth the best modes contemplated by the inventors for carrying out their invention. Various modifications, however, will remain readily apparent to those skilled in the above art, since the generic principles of the present invention have been defined herein specifically to provide a relatively economical method and apparatus for producing holographic copies of a master reference member by moving a point light source.

Referring to FIG I, a cross-sectional view of an assembled recording module 2 is disclosed. The recording module 2 includes a master reference member, such as a master hologram member 6, which has been developed and is mounted on a lower substrate support member 8. Alternatively, in some embodiments of this invention a master mirror, such as an aspheric mirror, can be used as the reference. A thin transparent substrate cover member 14 can seal and protect the master hologram member 6. The cover member 14 seals the master hologram 6 and permits repetitive exposures without the degradation of the master hologram. A pair of positional ball bearings, such as bearings 10 and 12, of approximately 0.005-inch in diameter, are shown mounted atop the thin substrate cover member 14 that is positioned over the master hologram 6. As can be readily appreciated, a series of ball bearings, such as three, will be actually utilized to maintain a constant displacement between the cover member 14 and the holographic recording material 16 that is mounted on the inner surface of the outer substrate 18. The recording material 16 can be a dichromated gelatin.

The lower substrate 8 and the outer substrate 18, along with the cover member 14, are shown embodied in a curved configuration made from glass. It should be understood that other materials can be used as substrates, such as semiconductor materials, are within the scope of the present invention and can be used for the substrates, e.g., 8, 18, depending on the wavelength of the radiation,. Although the recording module structure 2 is shown in a curved configuration, it should also be appreciated that the surfaces of any transmissive or reflective elements in the recording module 2 may be flat or have any desired configuration within the scope of the present invention. A concave surface for a master holographic aspheric mirror 6 is preferred for forming a HUD holographic element because of the simplicity of the recording system.

An index of refraction matching fluid 24, such as a mineral oil that can be approximately 0.005-inch thick, is positioned between the recording material 16 and the cover plate 14. Thus, a relatively thin layer of index matching fluid can replace the thicker image degrading layer of index matching fluid that was formerly used with a conventional aspheric mirror system used in producing holographic optic elements for a HUD. As can be further appreciated, the sealed hologram master 6 does not degrade, as frequently occurred with the surface of an aspheric mirror in a conventional HUD exposure system, nor does the oil have to be cleaned for reuse, since such a small amount can be simply replaced.

The outer substrate 18 supports the holographic recording material 16, which may be of any suitable phase-type recording material, such as a dichromatic gelatin or any suitable amplitude-type recording material, such as silver halide that is attached to the bottom of the substrate 18. The outer surface of the substrate 18 or the air/glass interface can be appropriately pre-coated with an anti-reflective coating 22 of an appropriate design for the wavelength of the incident energy beam during the intended use of the hologram. The specific structure of the anti-reflective coating 22 is not a specific component of the present invention, and it is known in the art to provide anti-reflective coating to match the desired wavelength of the incident beams.

The beam of coherent energy can be realized from any appropriate point source 28 that is capable of providing a developing energy wave beam. Advantageously, a laser can be used as the source of coherent energy. Exemplary dimensions in the embodiment of FIG. 1 are an outer substrate 18 thickness of approximately 0.35, inches, a matching oil thickness, 20, of approximately 0.005 inches, and a cover plate 14 thickness of approximately 0.02 inches. The photoreactive hologram layer 16 is typically in a range of 0.025 inches or less from the reference member 6. The point source 28 can be positioned about 20 inches from the reference member 6. A peripheral mounting ring 26 can be used to appropriately seal the recording module 2.

Referring to FIG. 1, the noise problem that creates the spurious hologram recording is schematically illustrated in an exaggerated view. The ray traces and relative location of the point source from position A to B are extremely exaggerated to disclose the principles of the present invention. Referring to the point source of light 28 at position A, the primary recording beam A1 travels through the glass substrate 18 to reflect off of the master reference member 6 and to again pass through the recording medium, such as a dichromatic gelatin 16. A companion recording light ray A2 crosses the reflected path of A1 to provide an interference recording in the dichromatic gelatin. This is the desired hologram. The reflected primary light ray A1 continues through the outer substrate 18, and a portion of that light energy is reflected back towards the recording medium 16. By referring to the light ray A3, we can see that another hologram recording is made as it intersects the path of the reflected primary recording ray A1 at a displaced position relative to the primary recording. This is an example of some of the surface reflection noise that can occur. As can be appreciated, other reflection noises can occur within the recording module 2.

The purpose of the present invention is to reduce the efficiency of such noise holograms by blurring the holographic fringes formed by interference of the noise sources with the primary beam, while not blurring the primary hologram. A reduction in the brightness of the spurious hologram is achieved by providing a relative motion of the point source 28 relative to the reflective reference member 6. This movement can be on the order of 0.1 to 5 mm or 0.2 m rad to 10 m rad. As seen in FIG. 1, when the point source 28 has been relatively moved to a position B, the primary light ray B1 will again reflect from the reference member 6 and interact with the light ray B2 to form a primary hologram. The relative displacement of the recorded hologram with a position at B is relatively small, compared to the primary hologram A, due to the proximity of the photoreactive layer 16 to the reflected surface 6. Typically, this distance will be approximately 0.04 inches or less. Additionally, the relative distance from the reference member 6 to the outer surface of the substrate 18 is relatively large, for example, by a factor of 10 over the distance between the reference member 6 and the recording medium 16. As can be readily appreciated, these particular distances are known, and calculations can be made based on the known indexes of refraction and the distances involved to subjectively design the relative displacement of the noise hologram from that of the primary hologram and the amount of the blurring of the noise hologram holographic fringes. The noise hologram that is formed by the primary reflected light ray B1 with the light ray B3 will be displaced from the noise hologram formed by the light source 28 at position A. The rate of movement of the light source will depend upon the necessary intensity of the light source and the recording time required in the recording material 16. These are subjectively determined depending on the particular holograph to be formed, as is well-known in the prior art.

Figure 3:
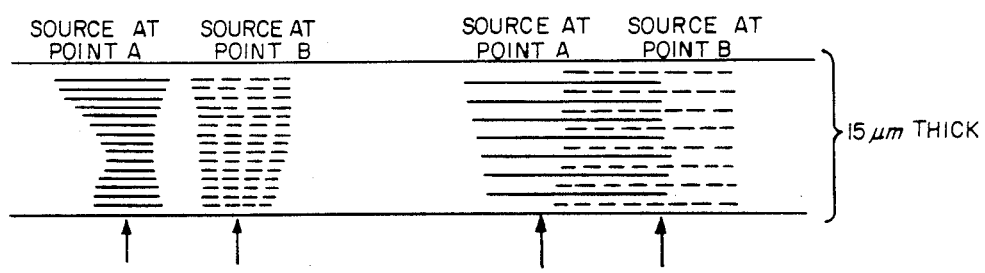
FIG. 3 is a schematic of a holographic fringe pattern formed as a result of moving the point light source.

This single beam reflection hologram system can produce both constructive and destructive interference between two portions of the beam, such as A1 and A2 and B1 and B2, after it is reflected from the reference member 6. Because of the close proximity of the recording material 16 and the reference member 6, there will be little change in the portion of the interference pattern, as the relative phase changes will be small because the relative pathlength changes are also small. Reference can be made to FIG. 3 to indicate this feature of the present invention. By contrast, the noise hologram which is formed between, for example, the beam A3 and the doubly reflected primary beam A1, will have a significantly larger distance with a relatively greater shift in the fringes for this noise hologram. If the phase shift reaches a half wavelength, the noise hologram will be wiped out. At that amount of motion, the shift in the primary hologram is only 1/20 th of the wavelength, which does not measurably reduce its efficiency. As shown in FIG. 3, the noise fringe patterns are interleaved so that light and dark fringe patterns are smeared.

Figure 4:
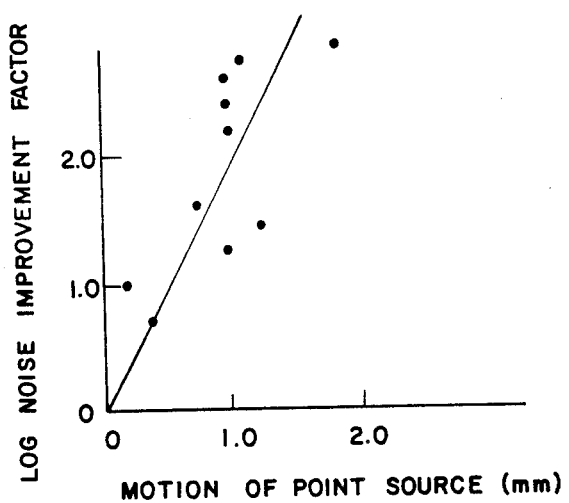
FIG. 4 is a chart showing the noise improvement resulting from a moving point source.

In the present invention, the particular method of movement is not critical, and various conventional means may be used. Thus, in tests the point sources were moved vertically relative to the recording module and were also moved horizontally. Additionally, the entire recording module 2 could be moved relative to a constant positioned point source. In essence, the effect desired for the present invention is a function of the angular change and therefore is a function of both distance and curvature in the reflecting reference member 6 and the source of refraction of the noise. Referring to FIG. 4, a chart showing the increase in log noise improvement over the movement of the point source is disclosed. The parameters from which the measurements for FIG. 4 were taken were those similar to those for exposing a HUD combiner with a 20-inch distance at an angle of incidence of 20 degrees. The largest motion of 1.85 mm resulted in an improvement in noise of approximately 630 times with only a minor loss in efficiency. The present invention represents a considerable improvement, for example, in the development of HUD combiners. Previously, with a HUD combiner using an aspheric mirror reference, moving cover plates were utilized to reduce the efficiency of the spurious noise holograms. With the present invention, there is no requirement that the exposure optics utilize a piezoelectrically controlled exposure cover. Accordingly, a holographic combiner or module can be loaded and exposed in a few minutes after a short stabilization period, instead of the prior art requirement of several hours of skilled labor and an overnight stabilization period. Additionally, this method and apparatus permit the substrate supporting the replica hologram image to be anti-reflection coated before exposure. This feature not only saves weight by removing an additional glass member in a final HUD combiner, but will also save money and considerable labor in the ultimate production of the HUD combiners on a mass production basis.

The procedure according to the invention also permits the master reference member, such as either an aspheric mirror or a master hologram structure, to be inspected for flaws with transmitted laser light before exposure.

Figure 2:
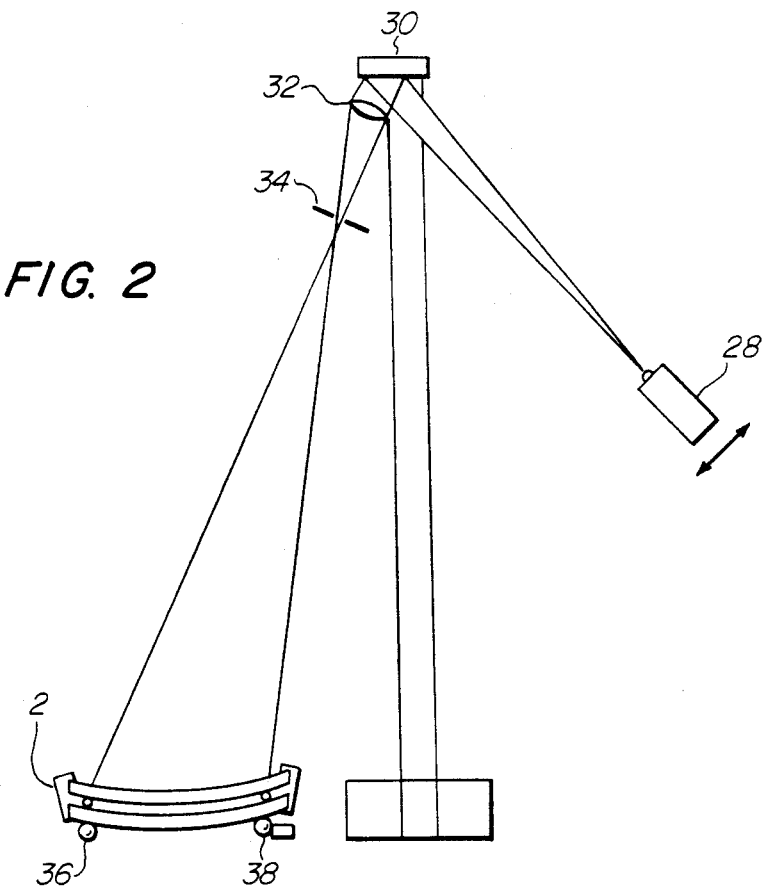
FIG. 2 is a schematic view of the system set up for a moving laser point source.

Referring to FIG. 2, a schematic view of a setup of the present invention is shown. The laser point source 28 can be appropriately moved for reflection off of a mirror 30. A condenser optic 32 can converge the light rays through a spatial filter 34. The recording module 2 can be mounted on indexing members 36, 38 to provide the desired position. The laser source 28 is then appropriately moved during the exposure period of the recording medium to produce the blurring of the noise holograms.

As can be appreciated by a person of skill in the holographic field, various subjective parameters are involved in recording a hologram. For example, the recording material, such as a dichromatic gelatin, is derived from a natural source and can provide different exposure characteristics and developing time periods. Additionally, the particular design wavelength and the availability of a constant light intensity for such a design wavelength for a particular hologram will have to be computed and will affect the specific parameters of any exposure system. For example, holograms used as aspheric reflectors in a HUD combiner preferably have a design wavelength that maximizes the reflection of light from a cathode ray tube. This wavelength is not readily available in a laser source, and computations are made in both the design of the reference member and the development of the exposed hologram to allow for this variance.

In essence, there are numerous variables that are subjectively determined when producing holograms, and this feature of the art should be considered when determining the scope of the present invention, since these variables can be utilized within the parameters of the present invention. Accordingly, the scope of the present invention should be measured from the following claims.

What is claimed is:

1. Apparatus for the production of holograms from a reference member, comprising:
   a beam of energy compatible with recording a hologram;
   a master reference member having reflective properties to the beam of energy;
   means for directing the beam of energy at the master reference member;
   a substrate having an inner end and outer surface;
   a recording medium positioned on the inner surface of the substrate adjacent the master reference member wherein the master reference member is closer to the recording medium than a source of holographic noise by a factor of at least 10;
   means for sealing the master reference member, substrate and recording medium into a recording module; and
   means for positioning the recording module for exposure by the beam of energy so that relative movement occurs during the exposure of the recording medium, the recording module being positioned so that a relatively small optical path change and small phase changes occur during movement in the production of a desired interference pattern, while a relatively larger phase change occurs for holographic noise formed over a greater optical path, whereby blurring of holographic fringes of the holographic noise is accomplished.

2. The invention of claim 1 wherein a point source of energy provides the energy beam and means are provided for relative movement of the point source during exposure to change the incident angle of the beam of energy with the master reference member.

3. The invention of claim 2 wherein the beam of energy is formed by a laser.

4. The invention of claim 1 wherein the master reference member is a hologram.

5. The invention of claim 1 further including means for varying the incident angle of the beam of energy with the master reference member.

6. An improved exposure system for the production of holograms from a reference member, comprising:
   a beam of coherent energy compatible with recording a hologram;
   a master reference member having reflective properties to the beam of energy;
   means for directing the beam of energy at the master reference member;
   a substrate having an inner and outer surface;
   a recording medium positioned on the inner surface of the substrate adjacent the master reference member, and
   means for causing a predetermined phase shift within an approximate range of 0.05 cycles in the beam of energy as it contracts and records an interference pattern in the recording medium whereby fringes of any holographic noise, such as cause by reflections of a reflected beam of energy from the outer substrate surface, are blurred.

7. The invention of claim 6 further including means for sealing the master reference member, substrate and recording medium into a recording module and means for matching the indices of refraction within the recording module.

8. The invention of claim 6 wherein the means for causing a predetermined phase shift during exposure includes a point source for forming the beam of coherent energy and means for providing a predetermined relative movement between the point source of energy and the master reference member.

9. Apparatus for the production of holograms from a reference member, comprising:
   a beam of coherent energy compatible with recording a hologram;
   a master reference member having reflective properties to the beam of energy;
   means for directing the beam of energy at the master reference member;
   a substrate having an inner and outer surface;
   a recording medium positioned on the inner surface of the substrate adjacent the master reference member;

an index matching fluid retained between the recording medium and the master reference member;

means for sealing the master reference member, substrate and recording medium into a recording module;

means for positioning the recording module for exposure by the beam of energy, and means for providing a variable phase shift in the beam of coherent energy as it causes a recording of a desired interference pattern in the recording medium by varying the incident angle of the beam of coherent energy as it contacts the reference member, wherein a predetermined phase shift is within an approximate range of 0.05 cycles, whereby the phase shift of any unwanted holographic noise, such as caused by any reflections from the outer surface of the substrate for interference with the beam of coherent energy, will be larger and will cause blurring of any holographic fringes that are formed by the noise.

10. The invention of claim 9 further including an antireflective coating provided on the outer surface of the substrate.

11. The invention of claim 9 wherein the means for causing a variable phase shift during exposure includes a point source for forming the beam of coherent energy and means for providing a predetermined relative movement between the point of energy and the master reference member.

12. A method for the production of holograms from a reference member, comprising:

providing a beam of coherent energy compatible with recording a hologram;

providing a master reference member having reflective properties to the beam of energy;

directing the beam of energy at the master reference member;

providing a substrate having an inner and outer surface;

providing a recording medium positioned on the inner surface of the substrate adjacent the master reference member;

sealing the master reference member, substrate and recording medium into a recording module;

positioned the recording module for exposure by the beam of energy;

substantially matching the indices of refraction within the recording module, and causing a variable phase shift in the beam of coherent energy as it causes a recording of a desired interference pattern in the recording medium by varying the incident angle of the beam of coherent energy as it contacts the reference member, wherein a predetermined phase shift is within an approximate range of 0.05 cycles, whereby the phase shift of any unwanted holographic noise, such as caused by any reflections from the outer surface of the substrate for interference with the beam of coherent energy, will be larger and will cause blurring of any holographic fringes that are formed by the noise.

13. Apparatus for the production of holograms from a reference member, comprising:

a beam of energy compatible with recording a hologram;

a master reference member having reflective properties to the beam of energy;

means for directing the beam of energy at the master reference member;

a substrate having an inner and outer surface;

a recording medium positioned on the inner surface of the substrate adjacent the master reference member;

means for sealing the master reference member, substrate and recording medium into a recording module; and means for positioning the recording module for exposure by the beam of energy so that relative movement is within a range of 0.1 to 5 mm and occurs during the exposure of the recording medium, the recording module being positioned so that a relatively small optical path change and small phase changes occur during movement in the production of a desired interference pattern, while a relatively larger phase change occurs for holographic noise formed over a greater optical path, whereby blurring of holographic fringes of holographic noise is accomplished.

14. Apparatus for the production of holograms from a reference member, comprising:

a beam of energy compatible with recording a hologram;

a master reference member having reflective properties to the beam of energy;

means for directing the beam of energy at the master reference member;

a substrate having an inner and outer surface;

a recording medium positioned on the inner surface of the substrate adjacent the master reference member;

means for sealing the master reference member, substrate and recording module; and means for positioning the recording module for exposure by the beam of energy so that relative movement is within a range of 0.2 m rad to 10 m rad and occurs during the exposure of the recording medium, the recording module being positioned so that a relatively small optical path change and small phase changes occur during movement in the production of a desired interference pattern, while a relatively larger phase change occurs for holographic noise formed over a greater optical path, whereby blurring of the holographic fringes of the holographic noise is accomplished.

15. Apparatus for the production of holograms from a reference member, comprising:

a beam of energy compatible with recording a hologram;

a master reference member having reflective properties to the beam of energy;

means for directing the beam of energy at the master reference member;

a substrate having an inner and outer surface;

a recording medium positioned on the inner surface of the substrate adjacent the master reference member wherein the distance between the master reference member and the recording medium is approximately 0.025 inches or less;

means for sealing the master reference member, substrate and recording medium into a recording module, and means for positioning the recording module for exposure by the beam of energy so that relative movement occurs during the exposure of the recording medium, the recording module being positioned so that a relatively small optical path change and small phase changes occur during movement in the production of a desired interference pattern, while a relatively larger phase change occurs for holographic noise formed over a greater optical path, whereby blurring of the holographic fringes of the holographic noise is accomplished.

16. Apparatus for the production of holograms from a reference member, comprising:
- a beam of energy compatible with recording a hologram wherein said beam of energy is formed by a laser;
- a master reference member having reflective properties to the beam of energy;
- means for directing the beam of energy at the master reference member;
- a substrate having an inner and outer surface;
- a recording medium positioned on the inner surface of the substrate adjacent the master reference member;
- means for sealing the master reference member, substrate and recording medium into a recording module;
- means for positioning the recording module for exposure by the beam of energy so that relative movement is within a range of 0.2 m rad to 10 m rad and the optical pathlength changes of the holographic noise is at least ten times greater than the optical pathlength for forming desired interference pattern and said relative movement occurs during the exposure of the recording medium, the recording module being positioned so that a relatively small optical path change and small phase changes occur during movement in the production of a desired interference pattern, while a relatively larger phase change occurs for holographic noise formed over a greater optical path, whereby blurring of the holographic fringes of the noise hologram is accomplished; and
- means are provided for relative movement of said least during exposure to change the incident angle of said beam of energy with the master reference member.

17. The invention of claim 16 wherein an antireflective coating is provided on the outer surface of the substrate.

18. The invention of claim 17 wherein the master reference member is an aspheric reflective interference hologram.

19. The invention of claim 18 wherein the recording module includes an index of refraction matching fluid retained between the recording medium and the master hologram reference member.

20. Apparatus for the production of holograms from a reference member, comprising:
- a beam of energy compatible with recording a hologram wherein said beam of energy is formed by a laser;
- a master reference member having reflective properties to the beam of energy;
- means for directing the beam of energy at the master reference member;
- a substrate having an inner and outer surface;
- a recording medium positioned on the inner surface of the substrate adjacent the master reference member;
- means for sealing the master reference member, substrate and recording medium into a recording module;
- means for positioning the recording module for exposure by the beam of energy so that relative movement occurs during the exposure of the recording medium, the recording module being positioned so that a relatively small optical path change and small phase changes occur during movement in the production of a desired interference pattern is approximately 0.05 cycles during movement, while a relatively larger phase change occurs for holographic noise formed over a greater optical path, whereby blurring of the holographic fringes of the holographic noise is accomplished; and
- means are provided for relative movement of said laser during exposure to change the incident angle of said beam of energy with the master reference member.

21. The invention of claim 20 wherein an antireflective coating is provided on the outer surface of the substrate.

22. The invention of claim 21 wherein the master reference member is an aspheric reflective interference hologram.

23. The invention of claim 22 wherein the recording module includes an index of refraction matching fluid retained between the recording medium and the master hologram reference.

* * * * *